United States Patent
Yach et al.

[11] Patent Number: 5,870,409
[45] Date of Patent: Feb. 9, 1999

[54] METHOD AND APPARATUS FOR TESTING A RELATIVELY SLOW SPEED COMPONENT OF AN INTERGRATED CIRCUIT HAVING MIXED SLOW SPEED AND HIGH SPEED COMPONENTS

[75] Inventors: Randy Yach, Phoenix, Ariz.; Rodney Drake, Phoenix, Ariz.

[73] Assignee: Microchip Technology Incorporated, Chandler, Ariz.

[21] Appl. No.: 671,011

[22] Filed: Jun. 28, 1996

[51] Int. Cl.$^6$ .................................................. G01R 31/28
[52] U.S. Cl. ............................................................. 371/22.1
[58] Field of Search ................................. 371/22.1, 21.1, 371/22.2; 365/201; 345/87

[56] References Cited

U.S. PATENT DOCUMENTS

| | | | |
|---|---|---|---|
| 4,635,259 | 1/1987 | Schinabeck et al. | 371/20.1 |
| 5,272,393 | 12/1993 | Horiquchi et al. | 307/296.6 |
| 5,331,358 | 7/1994 | Schürle et al. | 351/232 |
| 5,402,375 | 3/1995 | Horiguchi et al. | 365/189.09 |
| 5,532,718 | 7/1996 | Ishimaru | 345/211 |
| 5,583,822 | 12/1996 | Rao | 365/230.03 |

*Primary Examiner*—Hoa T. Nguyen
*Attorney, Agent, or Firm*—Blank Rome Comisky & McCauley LLP

[57] ABSTRACT

A method is disclosed for testing a high speed microcontroller fabricated on a semiconductor chip, and for testing relatively low speed functions of a liquid crystal display (LCD) module on the chip that drives an off-chip LCD for an external system to be controlled by the microcontroller with a plurality of discrete analog voltage levels for performing the LCD functions. Digital values are multiplexed in time slots of a test waveform to simulate in high speed digital format of a test mode the low speed timing, relative magnitude and functionality of analog voltage levels used to drive the LCD; A high speed driver is selectively coupled to a pin of the chip, to which the discrete analog voltage levels are normally applied at low speed to drive the LCD, and the test waveform is applied to the high speed driver. The digital values and timing that appear on the pin are then monitored as an indication of proper functionality of the LCD module. The high speed driver is switched out and the normal low speed LCD driver is switched back for return to an LCD user mode when the test mode is completed. Monitoring the pin with a digital tester allows verification that pin pulses in predetermined time slots indicate the corresponding analog voltage level is being applied at the proper time during normal operation of the LCD module, and digitally testing of continuity in an analog channel. A transistor normally employed on the chip for electrostatic discharge protection is activated to selectively couple the high speed driver to the pin for the high speed testing mode.

6 Claims, 10 Drawing Sheets

LIQUID CRYSTAL DISPLAY
AND TERMINAL CONNECTION

TYPE B WAVEFORMS

METHOD AND APPARATUS FOR TESTING A RELATIVELY SLOW SPEED COMPONENT OF AN INTERGRATED CIRCUIT HAVING MIXED SLOW SPEED AND HIGH SPEED COMPONENTS

CROSS-REFERENCE TO RELATED APPLICATIONS

This application is related to co-pending applications titled "Microcontroller with Internal Clock for Liquid Crystal Display" Ser. No. 08/671,933, "Microcontroller with Dual Port RAM for LCD Display and Sharing of Slave Ports" Ser. No. 08/671,962, "Microcontroller with LCD Control over Updating of Ram-Stored Data that Determines LCD Pixel Activation" Ser. No. 08/671,950, and "Microcontroller with Liquid Crystal Display Charge Pump" Ser. No. 08/671,575, filed on the same day and assigned to the same assignee as this application, and the disclosures of which are incorporated herein by reference.

BACKGROUND OF THE INVENTION

The present invention relates generally to microprocessors especially adapted to provide control functions for external systems or subsystems, and thus generally referred to as microcontrollers, and more particularly to microcontrollers which are capable of providing liquid crystal display (LCD) driver functions without need for peripheral elements other than the display itself.

An LCD generally comprises a pair of glass plates between which a liquid crystal material is sandwiched, the liquid crystal having the property of undergoing orientation of its crystal-like structure according to an electric field placed between transparent electrically conductive material on the plates, and thereby causing a selective darkening of the respective pixels with the passage of light through the liquid crystal to render the darkened pixels visible to the eye. The typical LCD, such as that shown in FIG. 1, which illustrates a panel 10 of the prior art, employs a plurality of commonly formed, potential alphanumeric characters 12. Each of the characters is in the form of a block figure "8" shape composed of a plurality of individual lineal pixels 15—typically seven as shown in the Figure, although more may be used where greater curvature or detail of reproduction of the particular alphanumeric character to be displayed is desired. In the seven pixel character, three horizontal pixels such as 17, 18, and 19 are vertically aligned and equally spaced apart, and two vertical aligned pixels 21, 22 (and 23, 24) are positioned at each end of the array of horizontal pixels bounding the respective spaces between the latter.

The pixels are conventionally driven by waveforms applied to a digitally encoded array of electrical conductors of printed circuit form (not shown in FIG. 1), each of the conductors on the top side of the LCD being connected to "segments", while the conductors on the bottom are connected to "commons". Hence, when a particular digital code (e.g., binary-based) is applied in the form of an electrical energization of the various conductors, a particular alphanumeric character is displayed on the LCD—assuming, of course, the presence of a source of light emanating through the plates. The "segments" are electrically energized by drivers which are supplied as part of a peripheral device, typically on a semiconductor circuit chip (not shown in FIG. 1). The "commons" are also driven by the semiconductor circuit chip in such a way that the RMS voltage across each of the pixels will be either above a threshold value (pixel dark) or below that threshold value (pixel clear). For any given LCD, the product of the number of "commons" multiplied by the number of "segments" is equal to the number of pixels in the display.

LCDs are used in a wide variety of applications including home security systems, industrial control thermostats, home thermostats, blood pressure meters, blood glucose meters, AC power meters, toys, voice recorders, microwave ovens, and carbon monoxide detectors, to name but a few. The use of LCDs in such applications, and in which one or more microcontrollers is used to control the system constituting the application in which the LCD is used, is, in and of itself, quite conventional. Heretofore, however, the display (which may include a large number of pixels) has been operated and controlled by its own power source and control devices, while the system in which or with which the display is used is separately controlled by the microcontroller. The requirement of separate control devices has adversely affected the cost, complexity, and size of the overall control portion of the system.

The nature of the problem may be better understood by reference to a relatively simple example of a thermostat which is used to control the temperature of the air in an enclosure by means of control exercised on a heating, ventilating, and air conditioning (HVAC) system for the enclosure. A thermistor provides an analog input indicative of the temperature of the air in the enclosure. An LCD display provides a visual indication of that temperature, and also displays a set point or set temperature which is designated by the user by appropriate selection using a keypad. An interrupt is provided by a keypad interface that allows the user to punch in certain keypad information as references which are used by the microcontroller to change the display, such as to write another output into memory—a select voltage for the thermostat output at which the microcontroller will turn on a heat pump in the system.

It would be desirable to consolidate everything, or at least a substantial part of the control functions, within a single product—namely, the microcontroller chip itself. Such a goal, however, is by no means a simple task. An LCD display operates at a considerably slower speed than a microcontroller. Also, the timing of the microcontroller control functions is different from the timing of the LCD control functions. Another issue arises in connection with the capability of a microcontroller to be placed in a "sleep" mode or sleep state to conserve power, whereas the LCD display must continue to function.

Present-day systems that control an LCD display which itself is used in conjunction with a system to be controlled by a microcontroller require a source of clock pulses to control the timing and updating of the display, among other things, when not supplied by the microcontroller itself, as when the latter is in its sleep mode. Although the microcontroller device package typically has a pin available for an external input, the device user may not wish to use that capability, preferring to reserve it for other essential purposes. For the LCD to remain operational, the timing module must supply clock signals to the logic section which drives the LCD display. In a typical present-day application, currently available microcontrollers are incapable of providing any clock function when in the sleep state.

If the device user's application requires that the LCD display must or should remain operational, it becomes necessary for the user to employ a separate device that will make external clock signals available for LCD control, by applying the external clock to an external pin of the microcontroller. This means that the selected pin (only a finite number of which are available—in a typical device, only one, or perhaps two) will be unusable for another purpose. And the other purpose may be much more essential in an emergency situation.

Two types of waveforms are variously used to drive an LCD display, as will be described in greater detail below. A type A waveform generates "common" and "segment" waveforms, with all data contained in a single frame and assembled in complementary fashion, such as high voltage and low voltage, to produce a DC value of zero for that frame. It is essential that the voltage waveform across the glass plates of the display be maintained at an average DC value of zero because the glass is likely to suffer a breakdown if a non-zero DC voltage is applied for any sustained period of time. A type B waveform generates "common" and "segment" waveforms with ,all of the data in two frames, the actual data being assembled in a first frame and that same data being assembled in inverse form in a second frame, such that an average DC value of zero is maintained for the type B waveform over a full two frames of data.

Generally, the type A waveform is employed for simple LCD displays, and the type B waveform is utilized for more complex LCD and higher MUX rate displays, the latter because of a better discrimination ratio for the type B which produces an enhanced viewing angle. To turn an LCD pixel on, the RMS voltage of either waveform must exceed the threshold voltage of the glass (or, more accurately, of the capacitive element constituting the electrically conductive confronting pixels), and to turn the pixel off, the RMS voltage value must be below that threshold voltage. The contrast in the display increases to a limited extent with increases in RMS voltage above the threshold voltage of the glass. A significant problem arises in the manner in which the waveform voltages are developed to drive the LCD efficiently from the microcontroller.

Because the type A waveform supplies data read from a random access memory (RAM) in a single frame of zero DC value, the RAM can be read or written to at any time. In contrast, with the type B waveform, since two frames are required over which to achieve the zero DC value it is necessary to retain the data in the RAM for that entire period, i.e., two frames or cycles of the waveform. A change of data in the RAM before the second frame is completed, for example, could result in the second frame not containing the inverse of the data in the first frame, and a resultant non-zero DC value.

The frame rates for LCD control are very slow, relatively, residing in the 60 to 100 hertz (Hz) range, whereas the microcontroller typically operates at rates of one megahertz (MHZ) or higher. With the fast-running microcontroller, it becomes difficult to maintain a DC value of zero in the type B waveform simply because data may be changing so rapidly. So the reliability and physical instability of the LCD glass itself presents a problem in operating an LCD display from a control function consolidated with the microcontroller.

Yet another substantial problem resides in the manner in which a consolidated LCD-functional microcontroller may be tested. The very slow speed LCD display poses serious problems in devising test methodology that will allow the microcontroller to be tested in a manner suited to its operating speed and which is not wasteful of test time or test cost. Moreover, the analog voltages and functions to be accommodated for the LCD conflict with a desire to conduct testing of the microcontroller on a digital tester or using digital simulations.

Another series of problems is encountered when the semiconductor substrate in which the microcontroller is fabricated is P-type rather than N-type. The conductivity of the P-type substrate makes it necessary to operate with positive voltages, including the development of positive voltages to operate and enable the various functions of the LCD display and its control.

A principal aim of the present invention is to provide a microcontroller device which efficiently and economically consolidates LCD control functions with system control functions of the microcontroller. More particularly, it is an object of the invention to consolidate into one part—one product—an analog interface for receiving and transmitting analog voltage (or other waveform) inputs and outputs, an LCD interface for updating the LCD display, and the microcontroller instructions and sequencer for performing control operations.

A related object is to incorporate at least a portion of the capability to control an LCD of a microcontroller-controlled system within the microcontroller chip itself.

Another principal aim of the present invention is to provide a test methodology for testing the microcontroller in a manner suited to its operating speed, with conservation of test time and cost, despite the slow operating speed of the on-chip control module for the LCD.

SUMMARY OF THE INVENTION

In a method for high speed testing of the relatively slow speed liquid crystal display (LCD) control module on board a microcontroller chip, wherein the LCD operates in conjunction with a system being controlled by the microcontroller and a plurality of discrete operating voltage levels are applied for performing the LCD functions, the chip is placed in a fixture for digital testing thereof, and, during a test mode, switched to a high speed driver for testing the LCD functions of the chip, from a standard driver in the control module. When the test mode is completed, the device is switched back to the standard driver from the high speed driver.

Also, in the testing method, pulses are time multiplexed in lieu of the operating voltage levels, and a pin of the control module is monitored to ascertain whether it is being pulsed at the time a voltage is to be applied in an operating mode of the module, as an indication that the LCD functionality is proper.

BRIEF DESCRIPTION OF THE DRAWINGS

The above and still further aims, objects, and advantages of the invention will become apparent from a consideration of the following detailed description of a presently preferred embodiment and method of use, constituting the presently contemplated best mode of practicing the invention, taken in conjunction with the accompanying drawings, in which.

DETAILED DESCRIPTION OF THE PREFERRED EMBODIMENT AND METHOD

Figure 1:
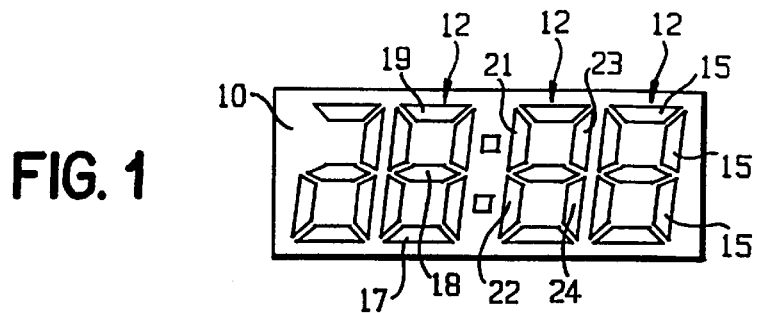
FIG. 1 is a simplified functional diagram of an LCD display of the prior art, which is useful for explaining the various parts of the display, described above.
Figure 2:
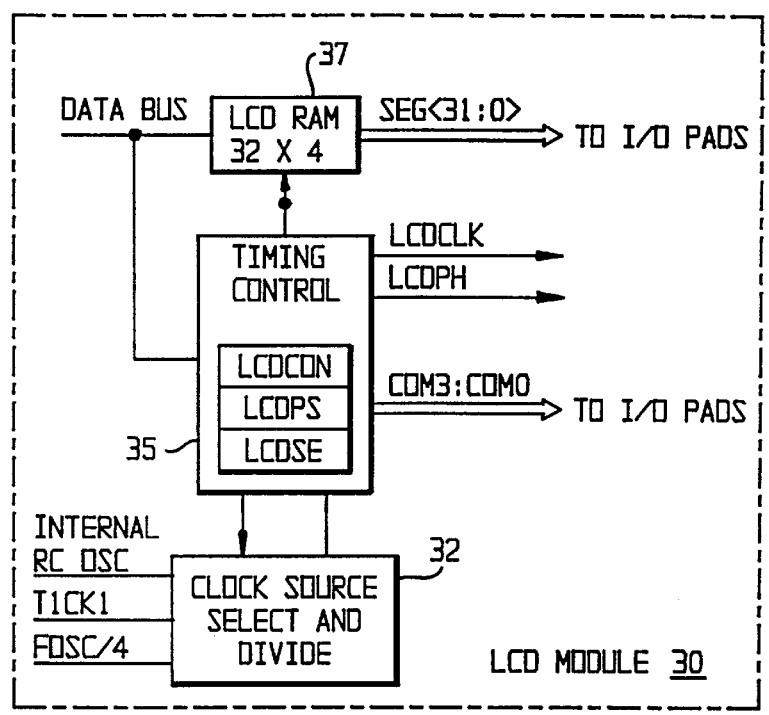
FIG. 2 is a block diagram of an LCD module to be fabricated on chip with a microcontroller for a system with which the LCD display is to be used.

Referring now to FIG. 2, an LCD module 30 is incorporated into the semiconductor (typically, silicon) chip (not shown) in which a microcontroller (to be described in some detail below) is fabricated, using conventional complementary metal-oxide-silicon (CMOS), polysilicon gate process technology. In the preferred embodiment of the invention, the microcontroller, and hence, the LCD module, are fabricated in a P-type conductivity silicon substrate, a factor which is significant in some, but not all, of the aspects of the invention.

LCD module 30 includes a clock source 32 with select and divide capability, which interacts with a timing control 35 that controls the operation of the LCD module. Timing control 35 tells the clock source to select one of three clock inputs—an input from an internal RC oscillator, an input T1CKI, and an input Fosc/4—and whether to divide down that clock input. The timing control also dictates to a random access memory (RAM) 37 when to update the data to I/O pad control circuitry on signals seg <31:0>, and also supplies signals 1cdclk, 1cdph, and COM3:COM0 to the pad control circuitry. Pad refers to the output of the silicon chip, which then becomes the input to the LCD glass.

The segments of each alphanumeric character of the LCD are driven by digitally encoded values which have been written to and are now being read from RAM 37, and transmitted to the pads. The digital values are converted into analog waveforms by the pad control circuitry which uses control signals from timing control 35, and analog voltage values provided by a charge pump or other source.

Figure 3A:
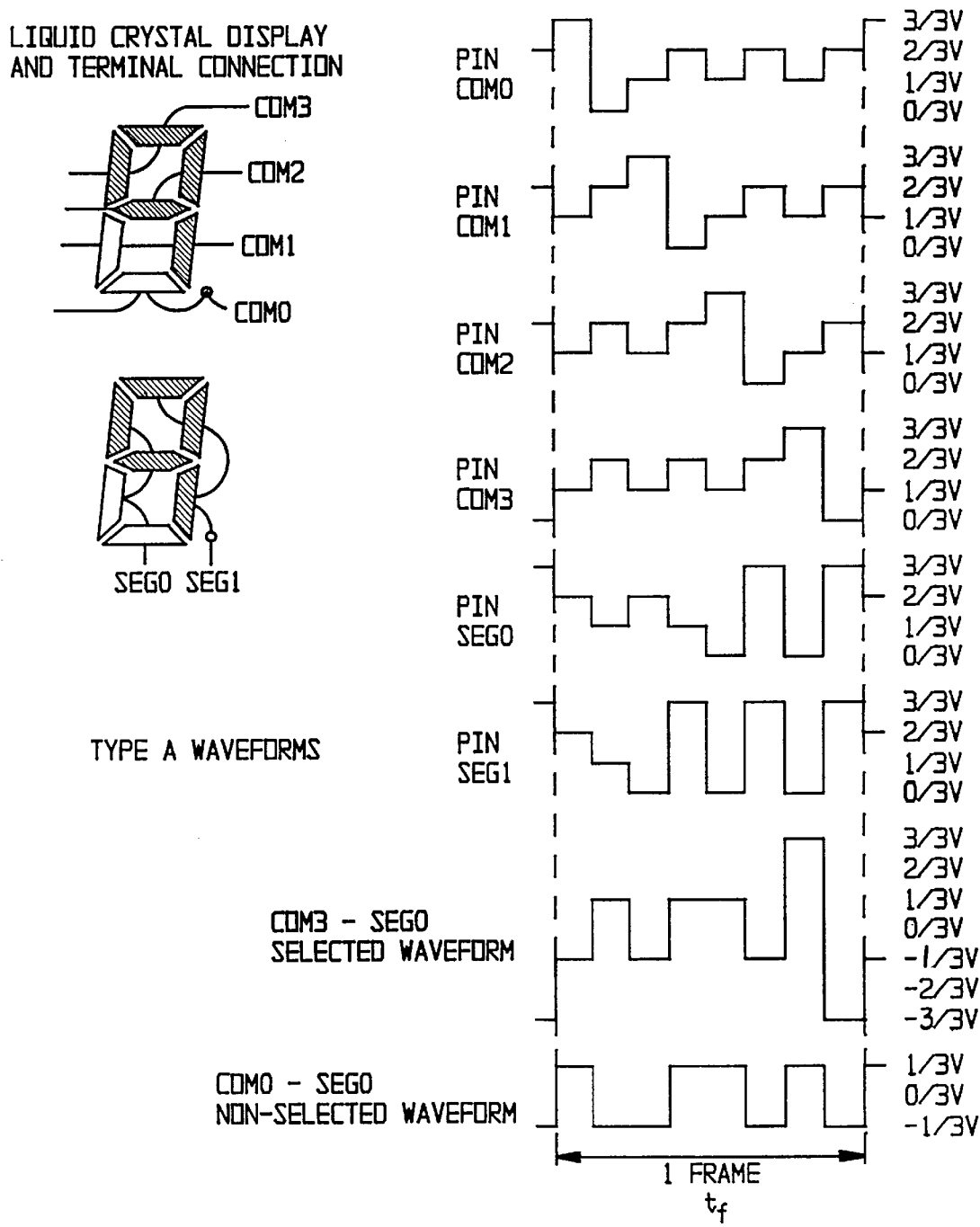
FIGS. 3A and 3B are examples of type A and type B LCD driver waveforms.
Figure 3B:
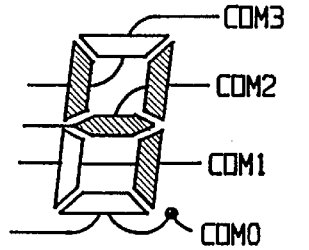
Figure 3B:
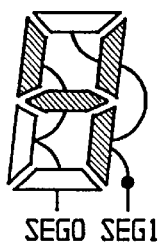
Figure 3B:
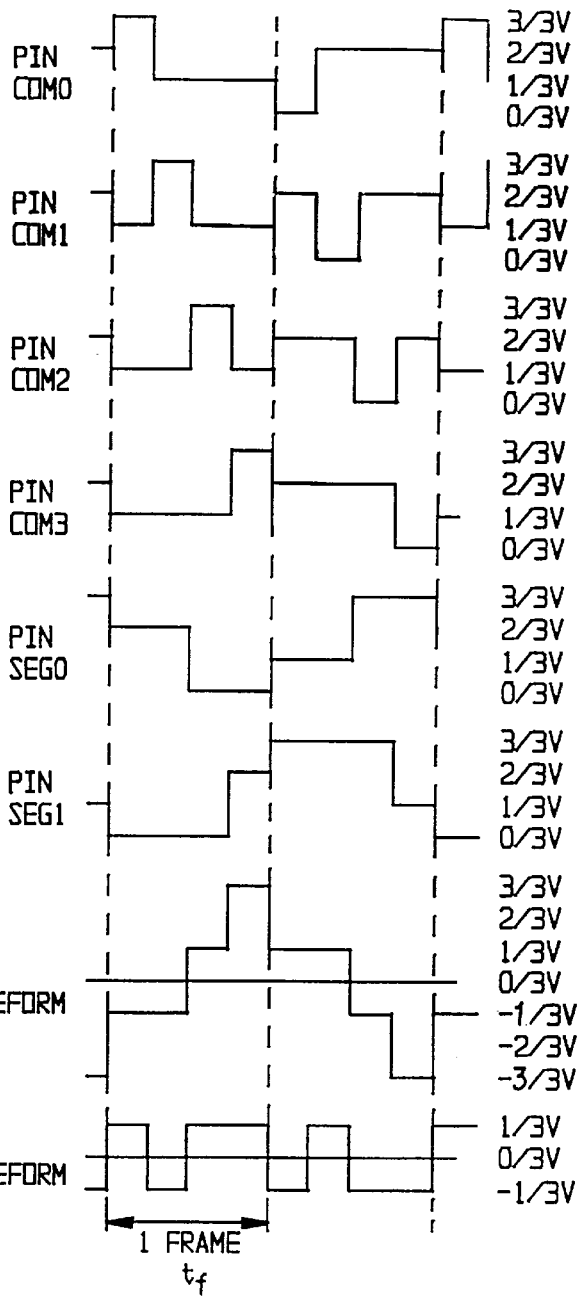

The waveforms generated are of either type A, illustrated in the example of FIG. 3A, or type B, illustrated in FIG. 3B. Referring to FIG. 3A, the type A waveform generates common and segment waveforms, with all data being contained in a single frame of complementary assembly with high and low voltage, and maintained at an average DC value of zero over the full frame. In the Figure, an LCD and the terminal connections for the pixels thereof are shown at the left side of the Figure, with darkening of the individual pixels by virtue of the waveforms shown at the right side which are produced in ¼ multiplex drive applied to the respective connections. The pixels are the separate horizontal and vertical bars of an alphanumeric display, although these are sometimes referred to as segments, and the number of pixels that can be driven is the arithmetic product of the number of segments times the number of commons in the display.

As shown in the FIG. 3A, each of the commons may connect to many pixels. Similarly, each of the segments may connect to many pixels. For example, in the top display, common 3 (COM3) connects to the uppermost horizontal pixel and to the upper left vertical pixel, COM2 connects to the upper right vertical and middle horizontal pixels, COM1 connects to the lower left and right vertical pixels, and COM0 connect to the dot (decimal point) and lowermost horizontal pixels. In the bottom display (separated for the sake of convenience and clarity of explanation, but in fact the same display as the top), segment 0 (SEG0) connects to the lower and middle horizontal pixels as well as the upper and lower left vertical pixels, and SEG1 connects to the dot, upper and lower right vertical pixels and upper horizontal pixels.

Now, looking at the right side of FIG. 3A, the waveforms appearing at the various pins and terminal connections are shown in the first six (reading top down) parts of the Figure. So, for the top waveform, at pin COM0, the maximum excursion of the waveform (to 3 V) appears in the first ¼ of the multiplex drive; while for the waveform at COM3, the maximum excursion is in the last ¼. The waveform depicted for SEG0 has a maximum excursion at each of the third and fourth ¼'s of the drive. When a common is "active" (i.e., large RMS value), all pixels associated with that common are active. Hence, in the case where COM3 is active, the upper left vertical pixel, for example, is active. And that pixel lies at an intersection of COM3 and SEG0. The combination of the two waveforms, shown in the next-to-last waveform as COM3-SEG0 has a maximum value at some point during the frame (in the last ¼), so the pixel at their intersection is "lit" (i.e., darkened) throughout the frame. On the other hand, the combination of the waveforms for COM0 and SEG0, shown as the last (bottom) waveform on that side of the Figure, has no maximum (excursion of 3V) at any time during the frame, so the bottom horizontal pixel lying at the intersection of that common and segment remains unlit (i.e., light) throughout the frame. In the Figure, the reference to "selected" and "non-selected" waveform simply means lit and unlit, respectively.

The same analysis holds for the display(s) and type B waveforms shown in FIG. 3B, except that here, a ¼ duty cycle drive is used in which all of the data is generated in two frames or cycles. Here again, the LCD and terminal connection are shown at the left side of the Figure, with darkening of the pixels arising by virtue of the waveforms shown at the right side and the terminal connections shown at the left. For example, looking at the top waveform at pin COM0, for which frame 1 is depicted between the first two dashed vertical lines and frame 2 follows immediately thereafter between the second and third dashed vertical lines, it will be observed that the frame 2 data is the precise inverse of the actual data assembled in frame 1. As previously noted, this guarantees an average DC voltage value of zero across the two frames.

For the present invention, type A waveforms are used at all times (one or the other type would always be used to the exclusion of the other). As previously discussed herein, an LCD pixel is turned on (i.e., darkened) by application of an RMS voltage that exceeds the threshold voltage of the glass. When the RMS voltage falls below that threshold voltage, the pixel is turned off. If a type B waveform were used, however, changes occurring in successive two frame increments would be written to and read from memory locations in the RAM. And, since two frames of data are required to achieve the zero average of DC voltage for a type B waveform, the data would be retained in the RAM for that entire period of two frames. As will be explained in connection with the discussion of FIG. 11, below, the timing of an updating of the data in the RAM where a type B waveform is used is carefully controlled because a change of data in the RAM before the second frame is completed could result in the second frame not containng the inverse of the data in the first frame, and a resultant non-zero DC voltage value. The high potential for consequent breakdown of the LCD glass cannot be tolerated.

The LCD module 30 of FIG. 2 is capable of supporting up to four commons and 32 segments. Each pixel on the LCD glass has two connections, one of which is to a common and the other to a segment. Each common, therefore, can only connect to as many unique pixels as there are segments.

For any given LCD driver, although the theoretical maximum number of pixels that can be driven is equal to the arithmetic product of the number of commons times the number of segments in the LCD, in reality the maximum number of pixels that are drivable may be less than the theoretical maximum because of loading on the analog voltage generator. The timing control 35 generates digital signals that indicate which common is active at any given time, and, together with clock source 32, controls when the segment data in RAM 37 is updated to the pad control circuitry.

Figure 4A:
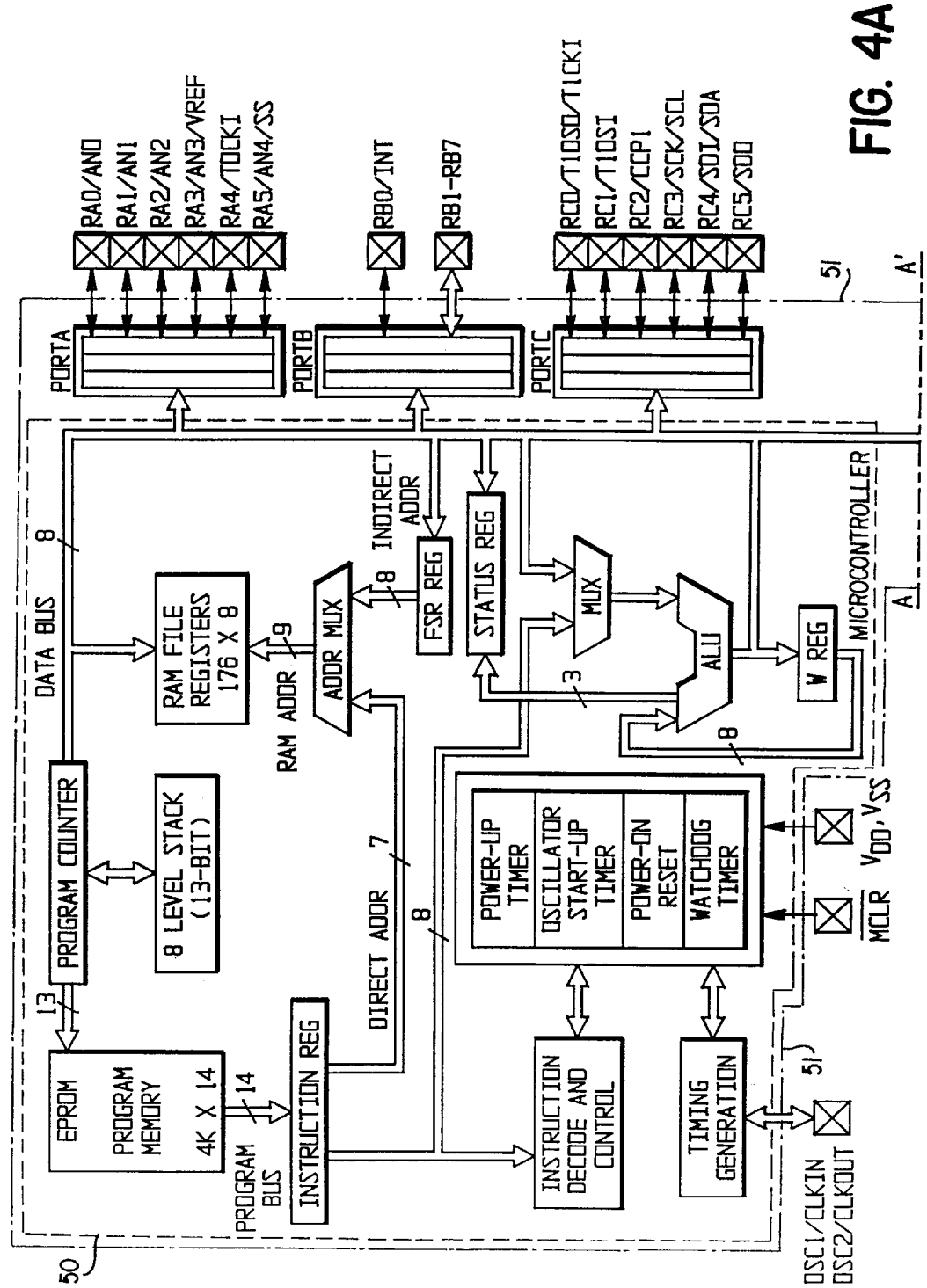
FIGS. 4A and 4B together are a simplified block diagram of a microcontroller with the LCD module of FIG. 2 incorporated in the microcontroller chip.
Figure 4B:
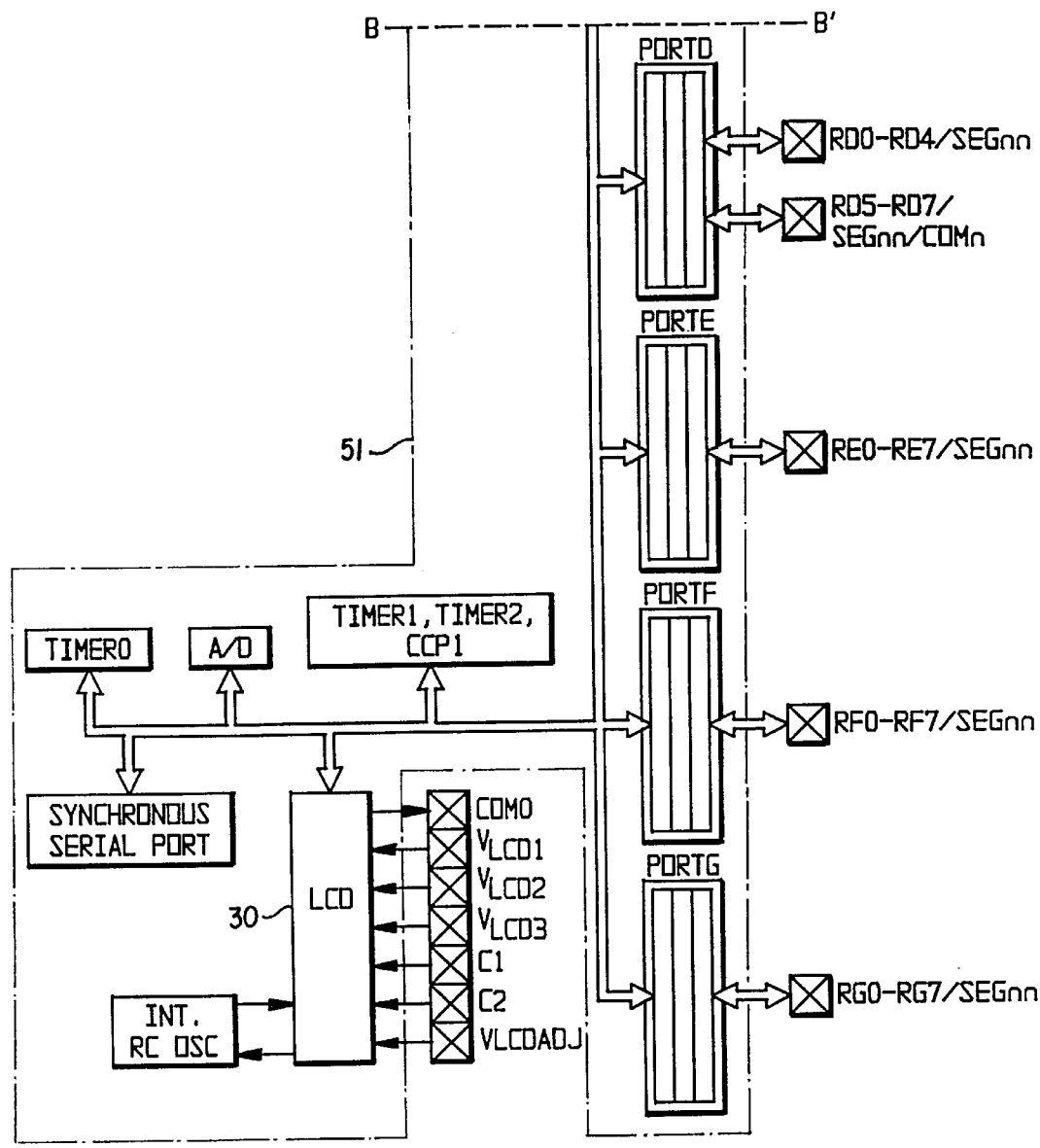

FIGS. 4A and 4B together are simplified block diagram of a microcontroller, illustrating some of its more significant functions, and including the relationship of the LCD module and other components such as an internal RC oscillator. The microcontroller 50 is fabricated on a silicon chip 51, into which LCD module 30 of FIG. 2 is integrated. The microcontroller has an analog interface for the convenience of users of the device, and an LCD interface for purposes of periodically (or intermittently, as necessary) updating the display, and for providing analog applications. These functions, together with microcontroller instructions and sequencing, enable the device to perform control functions and control operations, all in a single- or multiple-chip device within a single device package. All of the control functions are an integral part of the microcontroller structure and operation.

Driving an LCD with type A or type B waveforms is somewhat complex, using a structured technique to drive the RMS voltage across the capacitive circuit equivalent of the LCD glass, while the DC level at an average value of zero volts across the display to avoid a breakdown of the glass. All of the waveforms are generated from the digital section comprising LCD module 30, while the analog levels required for the control functions are provided from voltage generation circuitry which may be internal or external to the microcontroller.

The microcontroller core, or central processing unit (CPU), "talks" to the logic portion of the LCD module to control the timing of the LCD driver and the analog functions. A voltage generator in the form of a charge pump or a resistor ladder generates the voltages required to drive the pins for the LCD commons and segments. For LCD applications, discrete voltage levels must be made available, i.e., discrete steps of, for example, 1× voltage, 2× voltage, and 3× voltage. In the preferred embodiment, the operating range of the charge pump is 1.0 V to 2.3 V for the base voltage and twice and three times that, for the three output voltages required to be supplied. Actually, four voltages are required, but one of the discrete levels is ground. It should be observed that this is unlike the typical charge pump, in which only one voltage level is needed but where several stages are required to "pump up" a fixed low (typically, battery) voltage level to achieve that higher voltage.

Figure 5A:
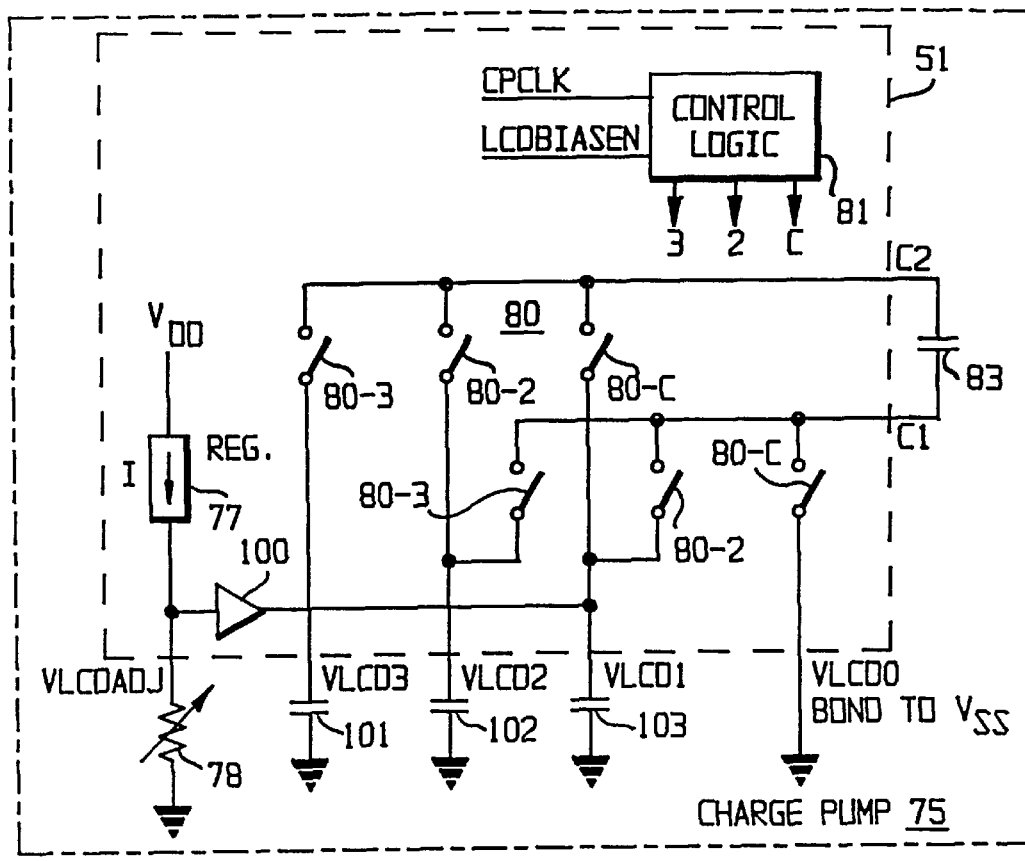
FIGS. 5A and 5B are schematic diagrams of a preferred embodiment of a charge pump using a switched capacitor configuration which is required to supply several voltage levels required for the LCD display, in multiples of a fixed base voltage determined by the power supply (battery) $V_{DD}$, and of an alternative resistor ladder configuration, respectively.

Referring now to the schematic diagram of FIG. 5A, several discrete voltage levels required for the LCD display are generated by the charge pump 75 in multiples of a fixed base voltage VLCD1, whose magnitude and range are determined by the power supply (battery) $V_{DD}$. This excludes a fourth level VLCD0, set at ground level $V_{ss}$. The base level voltage VLCD1 is taken from a tap on a current source 77 which is connected at one side to power supply $V_{DD}$ and at the other side to an adjustable resistor (potentiometer) 78. The potentiometer is external to the chip 51, which is encompassed in part by the dashed line in the Figure. The voltage on this output (VLCDADJ) is applied to the base voltage VLCD1 by a unity gain amplifier 100.

The desired voltage levels of charge pump 75 are achieved using a switched capacitor technique that employs a switch matrix 80 and control logic 81 (the latter being a state machine), along with capacitors 83, 101, 102, and 103. On the first active clock, switches 80-C are closed by control logic 81, to cause the capacitor 83 connected between pins C1 and C2 to be charged to the voltage level VLCD1 (nominally, 2V). On the second clock, switches 80-C are opened and switches 80-2 are closed, thereby causing capacitor 83 to be connected in series with VLCD1 and in parallel with VLCD2. Therefore, the charge on capacitor 83 will be dumped onto capacitor 102. So the effective voltage VLCD2 on capacitor 102 will eventually become 2× VLCD1 (nominally, 4V). On the third clock, switches 80-2 are opened and switches 80-C are closed again, to recharge capacitor 83 up to the voltage VLCD1. On the fourth clock, switches 80-C are opened and switches 80-3 are closed, so that capacitor 83 is placed in series with VLCD2 and in parallel with VLCD3. Therefore, the charge on capacitor 83 will now be dumped onto capacitor 101, and the voltage on VLCD3 will eventually become 3× VLCD1 (nominally, 6 V).

This charge pump configuration and method takes into account the use of a P-type substrate for the microcontroller and LCD module, recognizes that negative voltages cannot be generated, and enables the development of positive voltages relative to ground, taken to a level or levels that exceed the operating voltage ($V_{DD}$) of the part. So far as the LCD display application is concerned, the only point of interest for the LCD glass is that an RMS value is being generated (which, over the course of one frame for a type A waveform, or two frames for a type B waveform, has a DC value of zero). It does not matter whether that voltage is positive or negative.

The device user need only supply external potentiometer 78 and external capacitors 83, 101, 102, and 103 to allow control of the LCD from a voltage generator on the chip. There is no need to provide a separate voltage supply or voltage regulator. Three voltage levels are developed by the charge pump 75, by a voltage multiplication through capacitance charging. Ground reference provides a fourth level. All of the capacitances used are external to the chip, thereby requiring a separate pin for each one of the capacitors. External capacitors are employed because the instantaneous currents being driven are of sizable magnitude, so putting the capacitors directly on the chip would require large capacitance values, and would therefore substantially increase the size of the chip.

Figure 5B:
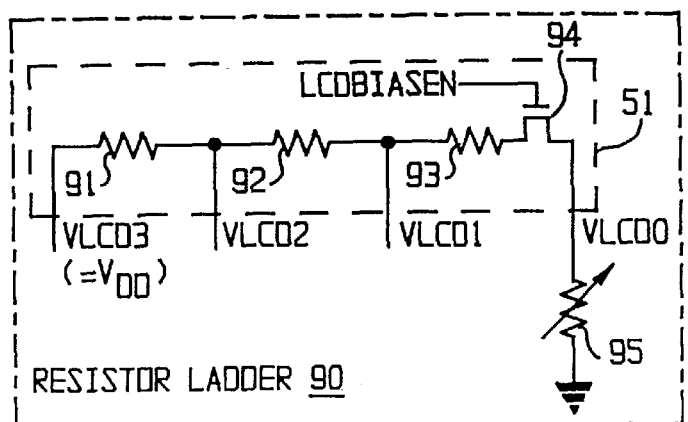

An alternative technique of obtaining the required discrete voltage levels uses a resistor ladder integrated in the silicon chip, which suffers both from a need for a power supply with an output voltage level that exceeds the highest voltage otherwise required in the system and from use of significantly more power than the charge pump. Although less desirable for those reasons, a suitable embodiment of a resistor ladder 90 is shown in FIG. 5B. The circuit includes resistors 91, 92, and 93 which are tapped from the supply voltage $V_{DD}$ in that order. A transistor 94 is connected between resistor 93 and VLCD0 to enable and disable the resistor ladder. The lowest or base voltage VLCD0 is connected to potentiometer 95, and the highest voltage is VLCD3 which is connected to $V_{DD}$. The three resistors 91, 92, and 93 evenly divide the voltage difference between VLCD3 and VLCD0. Therefore, the voltage on VLCD1 will always be one-third of that voltage difference above VLCD0, and VLCD2 will always be two-thirds of that voltage difference above VLCD0. The voltages VLCD 0, 1, 2 may be adjusted by varying the voltage drop across potentiometer 95.

With a resistor ladder, a higher supply voltage is needed, such as a 6.5V supply. A reasonable level of instantaneous current must be driven into the LCD display glass, meaning that the resistor sizes chosen for the ladder should be sufficiently low, and therefore, the current flow through the ladder is relatively high compared to that encountered for the charge pump switched capacitor technique. Another advantage of the charge pump is that the current flow is proportional to the LCD glass being driven—the more segments turned on, the higher the current magnitude. In contrast, for a resistor ladder, the current flow is approximately the same regardless of the nature of the LCD display.

Also, the switched capacitor charge pump is more effective than a resistor ladder in handling the decay in voltage that occurs over the life of the battery. The current source in the charge pump compensates for decreasing battery voltage by maintaining a constant current, and thus, a relatively uniform reference voltage for the display, despite the decay. Consequently, the LCD voltages on the display are held constant for a longer period of time. In contrast, the resistor ladder incurs a drop in the LCD voltages with decay of the supply voltage.

Nevertheless, some voltage losses are suffered in the system with use of the charge pump, attributable to the switching, the switch resistance, and related factors, as are encountered with virtually any switched capacitor design. To compensate, an overcharge condition is applied in which the level of voltage on a pin of interest is detected, and the detected value is fed back through an analog input to a comparator. If an insufficient charge level on the pin is observed from this active feedback process, the charge level is boosted accordingly, to compensate for losses.

Since some losses are always present, the discrete stepped voltages will not be at a perfect 2× and 3× of the base voltage. The base voltage is likely to remain at or near its original level because it is regulated, but the second and third voltages will tend to drop off. As a consequence, differences may be observed in the display for different data, with some loss of contrast, making it necessary to constantly adjust the display. Further, a DC voltage may be present that tends to cause a breakdown of the display over time, resulting in a serious reliability issue. If a very large load capacitance is present, as in the case where a large LCD is being driven, the charge pump may fail so that the voltage multiplication is degraded. Thus, a limit exists with respect to the size of the capacitance that can be driven in the LCD display.

Figure 6:
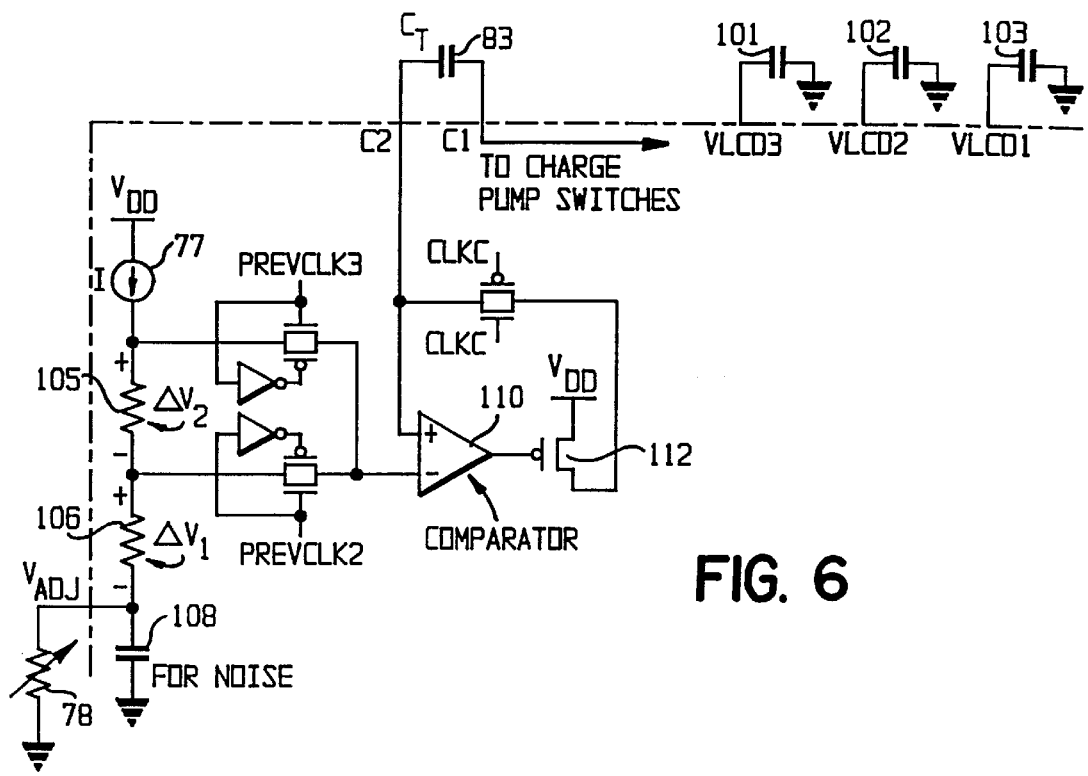
FIG. 6 is a schematic diagram of a feedback and capacitor overcharging circuit to compensate for energy losses arising in the switched capacitor charge pump of FIG. 5A.

In the technique of using feedback and overcharging the capacitor to compensate for system losses, current is drawn from the supply voltage $V_{DD}$ to charge the capacitors. An exemplary embodiment of such a compensating circuit is illustrated in FIG. 6. Two additional resistors—105 and 106—are placed in series with the output circuit of current source 77 of the charge pump circuit of FIG. 5A. Voltages designated $\Delta V_1$ and $\Delta V_2$ are present across resistors 106 and 105, respectively, and the series path terminates in an external potentiometer 78, as before. A small capacitor 108 is placed in parallel with the potentiometer to filter out noise during the clock cycle before the second discrete voltage level VLCD2 is charged. The buildup of charge on the switched capacitor 83 is monitored and applied to the positive input of a comparator 110. The negative input of the comparator is the base voltage plus $\Delta V_2$, since the switch is closed in the circuit path from the node between resistors 105 and 106 during that part of the clock cycle. Hence, if the charge across capacitor 83 is less than the base voltage plus $\Delta V_2$, the capacitor will be overcharged to the latter level.

This is accomplished as a result of the output of comparator 110 turning on transistor 112 until capacitor 83 is charged to the level of the base voltage+$\Delta V_2$, until the two inputs to the comparator are equalized and its output is nulled. Then, in the clock cycle before VLCD3 is charged, even more losses will accrue, and the base voltage plus $\Delta V_1$ from the tap on resistor 106 is applied as an input to the comparator. If the then-current charge on capacitor 83 is below that level (base level+$\Delta V_1$), an overcharge is applied to the capacitor, which ceases as soon as the two inputs to comparator 110 are equalized. Hence, the compensation takes place only when it is shown to be needed by the feedback circuit, and the overcharging circuit is only turned on when it is determined by the feedback to be necessary to charge up the capacitor 83.

The main advantages of the capacitor overcharging system of FIG. 6 are (i) the extra charge is obtained from the internal power supply $V_{DD}$; (ii) active feedback (an active charge monitor) is used to keep the voltage levels consistent; and (iii) by using a higher voltage ($V_{DD}$) than that required to reach the overcharged state ($V_{CAP}$), the charging time needed to reach that state is reduced. Also, the compensation for losses within the circuitry is attained without use of a special reference voltage, as might otherwise be expected to be a first consideration here. Rather, delta voltage levels are chosen close to the likely levels of circuit losses for the charge pump technique.

The system is further arranged and adapted to allow the LCD display operation to continue even while the microcontroller is "sleeping," i.e., is placed in a low power operating mode referred to as the "sleep" mode or "sleep" state. Although essential functions and monitoring activities remain active, to allow the microcontroller to recognize when it becomes necessary to perform a control function for the external controlled system, non-essential functions are deferred, to conserve power. According to an important aspect of this embodiment of the invention, a low cost internal RC oscillator is employed to decouple the timing function for the LCD from the microcontroller and to provide clock signals to the display. Thus, the sleep state of the microcontroller need not be disturbed to perform clock functions, and the device user need not supply external components for the clock functions or couple such functions to the microcontroller via an external pin on the device, but the LCD display continues to operate. And during those periods when the microcontroller is awake and fully operational, the LCD may be operated from either the microcontroller core or the internal RC oscillator, but is preferably operated from the microcontroller. Nevertheless, an external clock input may be provided to allow that input to drive the display during periods when the microcontroller is in the sleep state, should the user desire such external clock input capability.

Figure 7:
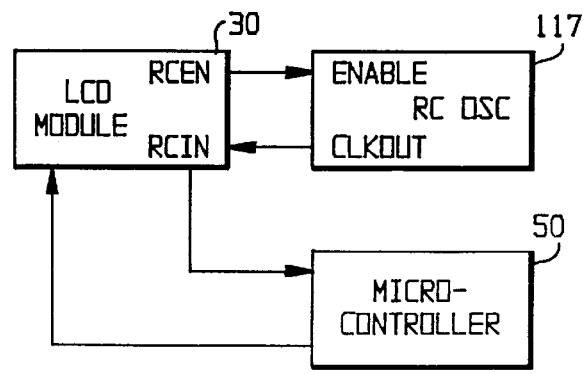
FIG. 7 is a simplified block diagram of the coupling of an internal RC oscillator to an LCD module fabricated on-chip with the microcontroller, for the oscillator to provide internal clock for the LCD display during periods when the microcontroller is in a sleep state.

In the simplified block diagram of FIG. 7, microcontroller 50 is coupled to the LCD module 30 to supply, among other things, clock signals from the microcontroller's internal clock for maintaining the operational timing of the display. When the microcontroller is not being called upon to provide functional control of its chip, or the external system intended to be controlled by it, or of peripheral devices, it is powered down to a sleep state. This may be accomplished in any number of known ways, one of which is to time the interval from the last functional activity of the microcontroller, other than the activity of supplying timing (clock) signals to the LCD module/display. When a predetermined interval has elapsed without further functional activity, the microcontroller enters the sleep state, but is subject to being revived or awakened when it is next called upon to perform functional activity.

The clock signals from microcontroller 50 are supplied to the LCD module 30. The module selects between the clock sources provided by the microcontroller 50 and the internal RC oscillator 117. The user must select which clock source is desired. Selection of the internal RC oscillator or an external clock will allow the LCD display to be driven during sleep, but not if the system clock (the microcontroller's internal clock) is selected. The internal on-chip clock provided by the RC oscillator is independent of the microcontroller's own internal clock.

Figure 8:
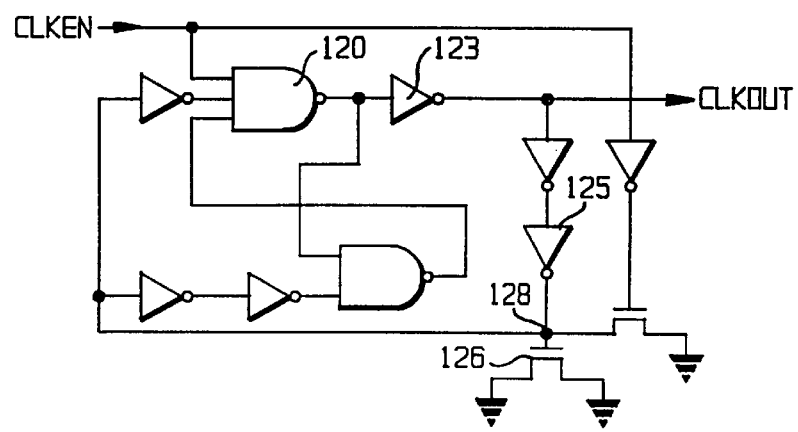
FIG. 8 is a schematic diagram of an exemplary internal RC oscillator for the circuit of FIG. 7.

The RC oscillator circuit 117 itself is illustrated in greater detail in FIG. 8, but it may be of entirely conventional configuration, the significant aspect being the incorporation of the internal RC oscillator on a microcontroller chip. The internal RC oscillator decouples the timing function for the LCD from the microcontroller during periods when the microcontroller is asleep, and allows the clock signals to be supplied directly from the oscillator, through the LCD module, to the LCD display. With reference to FIG. 8, input CLKEN to RC oscillator 117 enables oscillation when that input is high, and disables oscillation when the input is low. At the latter event, the output of a NAND gate 120 is always high, and the output of an inverter 123 is always low. Therefore, the output CLKOUT of oscillator 117 is low and no oscillations occur.

When the CLKEN input to the oscillator goes high, the output of NAND gate 120 goes low, which eventually causes the input of inverter 125 to go low. Although in these circumstances the output tries to go high, the pull-up device is very weak and a capacitor 126 connected to node 128 also militates against it. The capacitor takes from about 40 to 50 microseconds (μsec) to charge up, and when it does, the output CLKOUT (which had gone high when input CLKEN went high) is pulled low. The gate to inverter 125 therefore goes high and the output tries to go low, but the capacitor 126 is charged up and the pull-down device is weak, so the capacitor discharges over an interval of about 30 to 40 μsec. Then the output CLKOUT goes high, and the process repeats itself. Accordingly, the CLKOUT signal oscillates approximately every 100 μsec.

Thus, the LCD display can be operated from the clock output supplied by the internal RC oscillator 117 when microcontroller 50 is in the sleep state.

Figure 9:
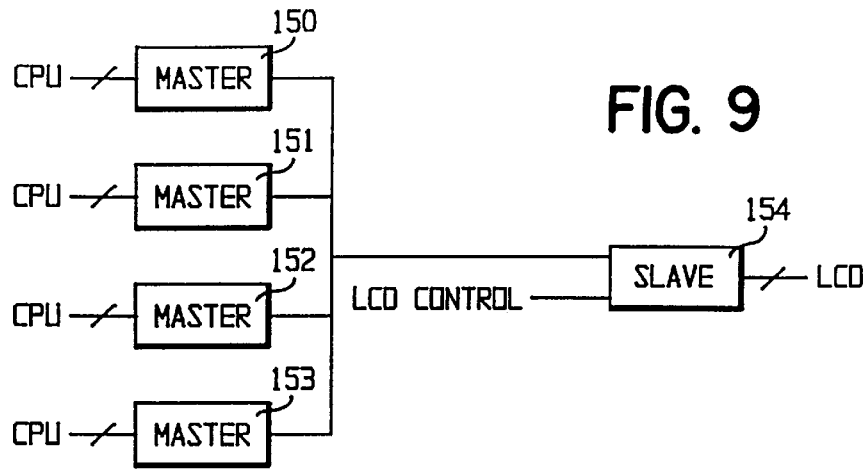
FIGS. 9 and 10 are a block diagram and a schematic diagram, respectively, of circuitry used in a technique that allows a simplified dual port RAM with slave sharing by multiple masters.
Figure 10A:
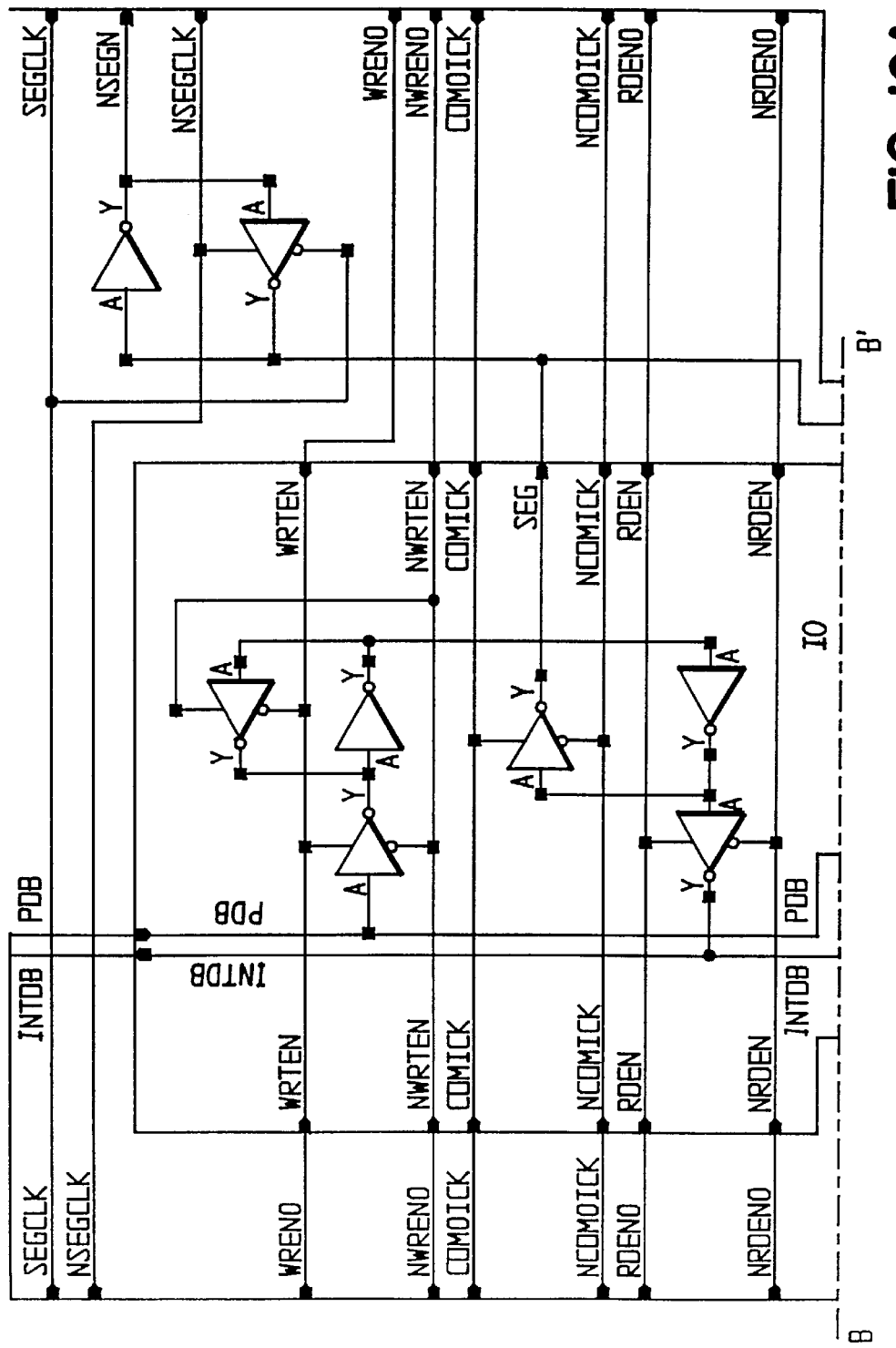
Figure 10B:
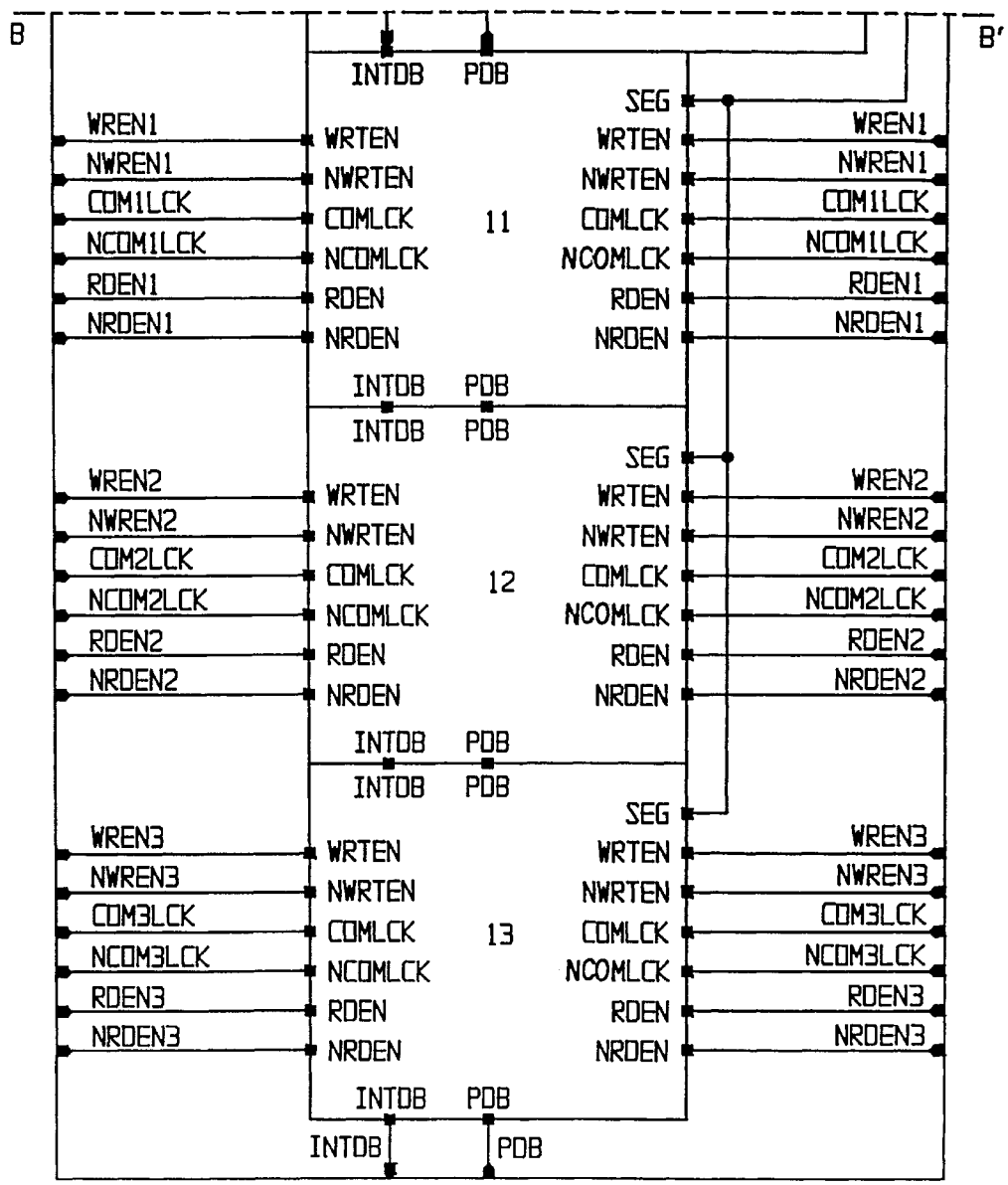

Referring now to the dual port RAM with slave sharing block diagram of FIG. 9, shown also in schematic diagram form in FIG. 10, the classical precharge, discharge, and clocking of the RAM are circumvented. For purposes of LCD control, the data, i.e., the pixels, are stored as bits in the RAM 37 (FIG. 2) by the device user. The LCD module 30 then updates the devices outside the chip, so there will be occasions when microcontroller 50 is communicating with RAM 37 at the same time that the RAM is communicating with the LCD. While the RAM is communicating with the microcontroller it may be updated, i.e., incremented, by the LCD controller, which typically requires large sized and relatively expensive dual port RAM. The device of FIGS. 9 and 10 provides a smaller sized and lower cost alternative.

Here, the RAM comprises a plurality of flip-flops, with a master side controlled by the central processing unit (CPU) of the microcontroller, and a slave side controlled by the LCD module. Four master latches 150, 151, 152, and 153, that communicate with the microcontroller as would be the case with any normal RAM register bit, are provided for each slave latch 154. The updating of the slave latch is controlled by the LCD module, and such updating is guaranteed not to occur at the same time that the data in a master latch is being changed. The purpose of this is to assure that only stable data is presented on the LCD segment outputs. The corresponding master-slave structure shown in the schematic of FIG. 10 is repeated 32 times for the 32 segments that may be supported by the LCD module.

As an example of the RAM operation, master latch 150 contains the data for a particular segment with respect to common 0. Just before common 0 becomes active, the LCD module updates slave latch 154 with the data in master latch 150. The data is then output to pad control logic where it is latched in when common 0 becomes active. Because the segment data for common 0 is latched at the pad, the LCD module is now able to update slave latch 154 with data from master latch 151. The latter is the segment data with respect to common 1, just before common 1 becomes active. Similarly, the segment data with respect to common 2 is contained in master latch 152, and with respect to common 3 is in master latch 153. This process continues for as many commons as are specified.

By virtue of the pad control logic latching the segment data, the LCD module can update the next segment data in the slave latch from the respective master latch, before the next common becomes active. Hence, only one slave latch is required for each segment output.

On the slave side, the effect is a 4-to-1 multiplex, but a wired connection is employed because the masters are mutually exclusive for driving purposes. Only 32 slaves are required, and, instead of 128 (i.e., 32×4) separate master-slave combinations, 128 masters are employed with the 32 slaves. This technique of slave sharing by several masters significantly reduces the size and complexity of the RAM, and is accomplished by allowing time multiplex-sharing of slaves through a scanning of the slave ports because each slave is only being read in a respective particular time frame. In contrast, a classic dual port RAM requires a master for each slave, with an individual slave for every bit, so that the slave can be read from one side and the master can be written to on the other. In addition to simplifying the RAM, there is a considerable saving of silicon area in the device.

If type A waveforms are used to drive and control the LCD display, the RAM may be updated at any time. At the higher MUX rates, however, type B waveforms would be preferred. In an embodiment using type B waveforms, illustrated in FIG. 11, a controlled updating of the RAM is performed. With type B waveforms driving the LCD, the microcontroller is allowed to write to the RAM, according to another aspect of the invention, only during a prescribed interval of time. In particular, updating of the RAM is permitted only after two cycles—i.e., two full frames—of the waveform have elapsed, and before the next cycle is commenced. After that updating, two more cycles of the type B waveform must elapse before the next update of RAM is permitted.

Figure 11:
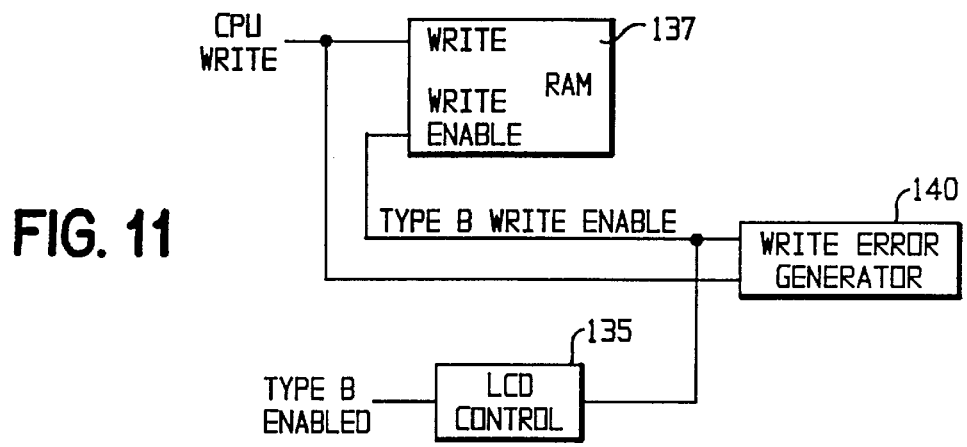
FIG. 11 is a block diagram of a circuit employed for controlled updating of the RAM using a type B waveform to drive the LCD display.

In FIG. 11, LCD control 135 is enabled by a type B waveform to provide a write enable to RAM 137. This write enable is provided only between the end of the second frame and the beginning of the next frame of data—not during any part of the actual two consecutive cycles of the type B waveform. In this scheme, if an attempt is made to write to the RAM before a write is allowed, the attempted write is disallowed, and an error bit is set by a write error generator 140, to inform the user of the disallowed attempt to update the RAM. This operation tends to guarantee that a voltage exceeding a value of zero DC voltage will not be placed across the LCD glass, at least for a sustained period that could otherwise result in breakdown of the display. The user must decide what action should be taken.

If the RAM is written to and no error bit is set, the indication is always that the write has been accepted by the RAM, and the user is neither notified nor obliged to take any further steps. But the setting of an error bit during an attempted write calls for a need to review the data in the prescribed location in memory and, if found to be needed, the making of an appropriate correction. If desired, an interrupt may be generated by the LCD control, to inform the user when a data write to the RAM may commence.

Turning now to another aspect, a significant problem is encountered in seeking to develop a methodology for high speed testing of the circuitry and the overall functional capability of LCD control, because of the relatively slow speeds at which the LCD and the LCD control module operate compared to the high speed microcontroller. For example, if an analog voltage is written to test a designated function of the microcontroller, the test apparatus must wait for the 60 Hz period of the slow LCD display to measure or even to check for application of that voltage, which would constitute a waste of very expensive test time and efficiency. According to the invention, a test system is employed that uses multiplexed values in high speed slots to verify that the correct voltage or pulse is obtained at the output, based solely on digital circuits. This enables very high speed, low cost testing, without need to assess analog voltages to assure that the microcontroller/LCD module is operating as intended.

Normally, the LCD pin is driven by a low speed driver to accommodate the operation of the LCD display and its control module. The invention provides a user mode in which such operation is maintained, and, for high speed testing of the overall device, a test mode in which the LCD pin is driven at high speed. To that end, in the user mode the normal LCD drivers for the display are used to apply the appropriate voltages at speeds suited to the display and the related circuit functions. And, in a separate test mode, a different driver capable of relatively very high speed operation is switched in purely for the sake of the test. When the device testing is completed, the high speed driver is switched out and the normal LCD driver is switched back in for operation of the device in the user mode.

Figure 12:
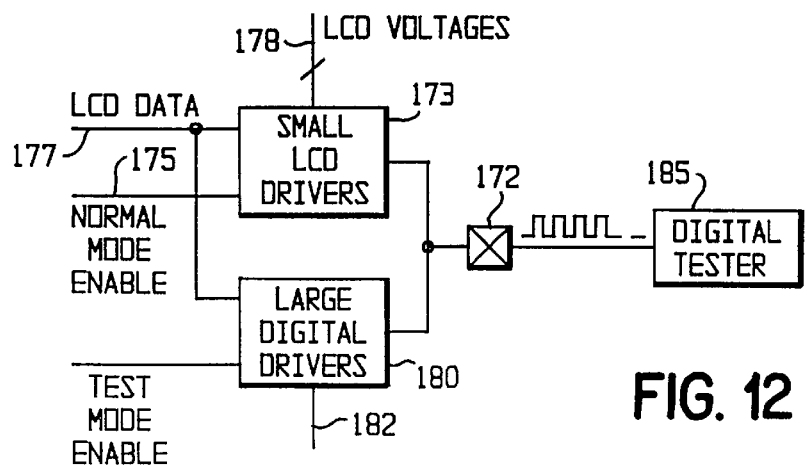
FIG. 12 is a simplified block diagram illustrating a preferred methodology for high speed testing of the relatively slow speed LCD and LCD control module.

Referring to FIG. 12, an LCD pin 172 to the LCD display is normally driven by low speed small LCD drivers 173 in response to application of a normal or user mode enable signal 175. As previously described herein, the drivers accept LCD data and LCD voltage levels as inputs 177, 178 to supply appropriately encoded signals to drive the segments of the LCD display. When the device is to be tested, the normal mode enable signal is removed, thereby disabling the small LCD drivers 173, and a test mode enable signal 179 is applied to enable high speed large digital drivers 180 to drive LCD pin 172. Testing is conducted by detecting digital pulse levels and timing right at the pin. For example, in normal operation of the display, four different analog voltages may be written to pin 172, with each of the voltages in distinct and different time phases relative to the others. In the test methodology of the invention, test pulses are multiplexed for application to the driver in the different time slots, along with the LCD data, to represent in high speed digital form the low speed analog voltages and timing of the inputs, at pin 172. The test equipment—a digital tester 185—then simply observes digital levels and timing that appear on the pin.

If the pin pulses in a predetermined time slot, it is indicative that the corresponding analog voltage is applied at the proper time, and so forth for each slot. This scheme allows digital tester 185 to be used to test continuity in an analog channel. Rather than looking for discrete voltages, the tester looks for a pulse in a time window, on a high speed port switched in specifically for the test. This technique also permits simulation to be performed using a digital simulator, which is restricted to "1's" and "0's", of all of the analog LCD functions and voltage levels that may be found in the LCD module operation for different applications.

In addition to its other advantages, provision of a capability to drive the module in a high speed test mode is achievable at no additional cost or penalty from the standpoint of silicon usage. This is because, if use is made of the transistor commonly required to be in the circuit for electrostatic discharge (ESD) protection on the pad, the same transistor may be made active for purposes of the high speed test mode.

Although certain preferred embodiments and methods have been described herein, it will be apparent to those skilled in the art to which the invention pertains from the foregoing description that variations and modifications of the described embodiments and methods may be made without departing from the true spirit and scope of the invention. Accordingly, it is intended that the invention shall be limited only to the extent required by the appended claims and the rules and principles of applicable law.

What is claimed is:

1. A method for testing relatively low speed functions of a liquid crystal display (LCD) control module fabricated together with a high speed microcontroller on a semiconductor integrated circuit chip, during testing of the microcontroller in a relatively high speed test mode, wherein in a normal mode the microcontroller controls a system external to the chip which includes an LCD display and the LCD control module controls the LCD display by supplying a plurality of discrete analog driving voltages as encoded signals to an LCD pin of the chip for the module from slow speed driver circuits fed by LCD data and LCD voltage levels to drive segments of the LCD display and thereby cause the display to perform LCD functions, said method comprising the steps of:

placing said chip in a fixture for digital testing of the chip in a test mode;

substituting high speed drivers of the test mode for the slow speed drivers of the normal mode in the control module to drive said pin with high speed pulses having digital values indicative of said analog voltages;

time multiplexing said pulses in preselected high speed time slots of a waveform in the test mode to represent said analog voltages and timing thereof on said pin, whereby said pin is pulsed in the test mode at high speed with digital values which are timed to simulate a predetermined timed sequence of the application of said analog voltages to the pin to drive the LCD display in the normal mode, and monitoring the digital values and timing of the high speed pulses at said pin in the test mode to verify the functionality of the LCD control module.

2. The method of claim 1, further including restoring the slow speed drivers of the normal mode in readiness to drive said pin with said analog voltages when testing of the microcontroller and the LCD control module of the chip in the test mode is completed, and removing the chip from the fixture.

3. The method of claim 1, wherein the chip includes a transistor which is normally employed for electrostatic discharge protection of the chip, and the step of substituting the high speed drivers for the slow speed drivers includes activating said transistor to selectively couple the high speed drivers in place of the slow speed drivers to drive the pin in the test mode.

4. Apparatus for testing relatively low speed functions of a liquid crystal display (LCD) control module fabricated together with a high speed microcontroller on a semiconductor integrated circuit chip, during high speed testing of the microcontroller in a test mode, wherein in a normal mode the microcontroller controls a system external to the chip which includes an LCD display and the LCD control module controls the LCD display by supplying a plurality of discrete analog driving voltages as encoded signals to an LCD pin of the chip for the module from slow speed driver circuits fed by LCD data and LCD voltage levels to drive segments of the LCD display and thereby cause the display to perform LCD functions, said apparatus comprising:

a test fixture for receiving the chip for digital testing thereof in a test mode;

high speed drivers adapted to be substituted in the test mode for the slow speed drivers of the normal mode in the control module of the chip to drive said pin with high speed pulses having digital values representative of presence or absence of said analog voltages, and means for selectively coupling said high speed drivers in place of the slow speed drivers to said pin;

means for time multiplexing said pulses in preselected high speed time slots of a test waveform in the test mode to represent the analog voltages and timing thereof on said pin from the slow speed driver circuits for implementing a predetermined LCD function of the LCD display in the normal mode, whereby said pin is pulsed in the test mode at high speed with digital values which are timed to simulate a predetermined timed sequence of the application of said analog voltages to the pin to drive the LCD display to perform said predetermined LCD function in the normal mode, and means for monitoring the digital values and timing of the high speed pulses in the test waveform at said pin in the test mode to verify the functionality of the LCD control module in the normal mode.

5. The apparatus of claim 4, wherein said means for selectively coupling includes a transistor of the chip normally employed for electrostatic discharge protection of the chip, and means for activating said transistor to couple the high speed drivers in place of the slow speed drivers to drive the pin in the test mode.

6. A method of digitally testing in a test mode a relatively slow speed component of a semiconductor integrated circuit chip having mixed slow speed and high speed components, wherein the chip has at least one pin reserved to be driven by the slow speed component to be tested and wherein said slow speed component has a slow speed driver adapted to be fed by data and voltage levels for supplying analog signals to said pin in a sequence selected to produce a desired operating pattern of an output device coupled to the pin in a normal operating mode of the chip, said method comprising the steps of:

placing the chip in a fixture for digital testing thereof, and switching the chip from the normal operating mode to the test mode, including substituting a high speed driver for the slow speed driver of the slow speed component to be tested, and applying test signals to the high speed driver to produce therefrom a pulse sequence in the test mode with digital values representative respectively of presence or absence of said analog signals in the normal operating mode;

inserting said pulse sequence into respective predetermined time slots of a high speed waveform for application to said pin in the test mode to simulate the analog signal sequence at slow speed for a predetermined operating pattern of the output device at said pin when the chip is in the normal operating mode; and monitoring at the pin the pulses in the high speed waveform applied to said pin from the slow speed component in the test mode as being representative of the timed sequence of said analog signals for producing said predetermined operating pattern.

* * * * *